Dilectus Durfee Improvement in Fruit Dryer

72377

PATENTED
DEC 17 1867

Witnesses.
Cornelius Cox
A. N. Man

Inventor
Dilectus Durfee
per
Alexander Mason
Atty

United States Patent Office.

DILECTUS DURFEE, OF FORT SENECA, OHIO.

Letters Patent No. 72,377, dated December 17, 1867.

---

IMPROVED FRUIT-DRIER.

---

*The Schedule referred to in these Letters Patent and making part of the same.*

---

TO ALL WHOM IT MAY CONCERN:

Be it known that I, DILECTUS DURFEE, of Fort Seneca, in the county of Seneca, and in the State of Ohio, have invented certain new and useful Improvements in Fruit-Drier; and do hereby declare that the following is a full, clear, and exact description thereof, reference being had to the accompanying drawings, and to the letters of reference marked thereon.

Figure 1:
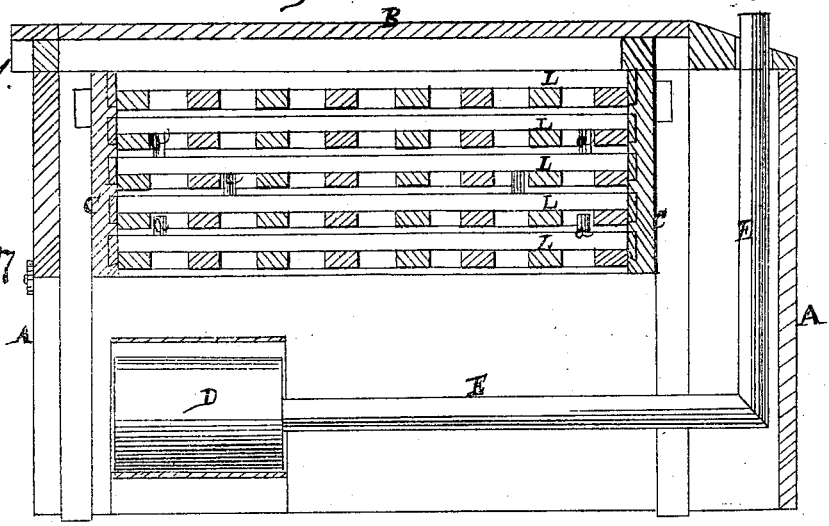
Figure 2:
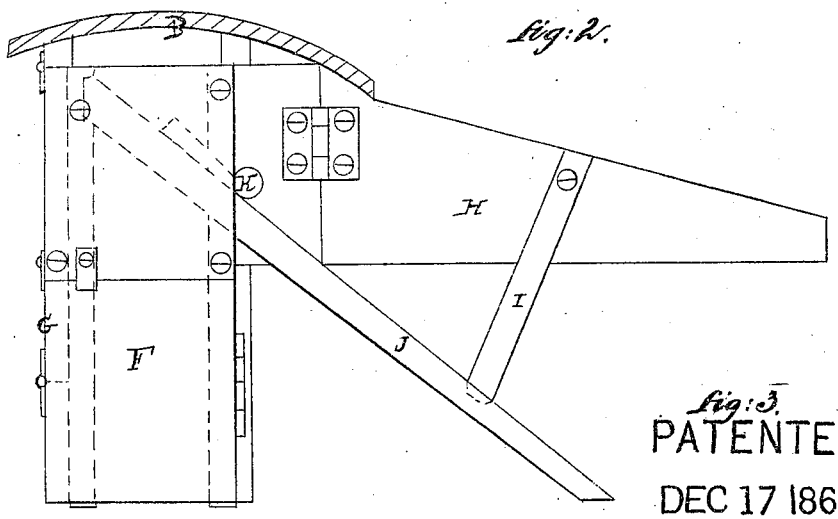

In the annexed drawings, making part of this specification, A represents a large rectangular box or kiln, which is provided at its top with a hinged lid, B, at one end with a door, F, and at its back with a door, G. D represents a stove or furnace, which is placed in the box near the door F, and which is provided with a pipe, E, which runs beneath the fruit-drawers, and then passes up through a flue, in the end of the box, to its top. C C' represent divisions in the box A, which are placed vertically near the ends of the box. The inner faces of these partitions or division-boards are either grooved or provided with cleats to form ways on which the fruit-drawers slide or rest. L L represent the fruit-drawers, which are simply drawers with slatted bottoms, separated sufficiently to allow of the passage of air up through them freely. The grooves may be made dove-tailed, or the cleats may be so formed that they will, when secured on, form dove-tailed grooves, and the ends of the drawers are formed to fit snugly in these grooves. Every other drawer is provided with a pin in its back rail, which catches into a recess of the rail of the drawer above it. These pins connect the drawers together, allowing them to draw out in succession, but not permitting them to separate. H H represent two hinged supporters, which are provided on their inner faces with grooves or cleats similar to those on the division-boards C C', the supporters being hinged to the box in such a manner, that when they are opened out, as seen in fig. 2, their grooves form a prolongation of those upon the boards C C'. The object of these supporters is to sustain the drawers when they are drawn out of the box, in stair-step form, to allow of the action of the sun upon the fruit when desirable. J J represent two stays, which project from the box, and being inclined, their outer ends rest upon the earth or the floor upon which the drier is placed. Pivoted to the supporters H are two arms, I I, which project downward, with their lower ends resting in recesses formed for them in the stays J J. The arms I I serve to brace up and sustain the outer ends of the supporters H, when they are encumbered with the weight of the drawers.

Figure 3:
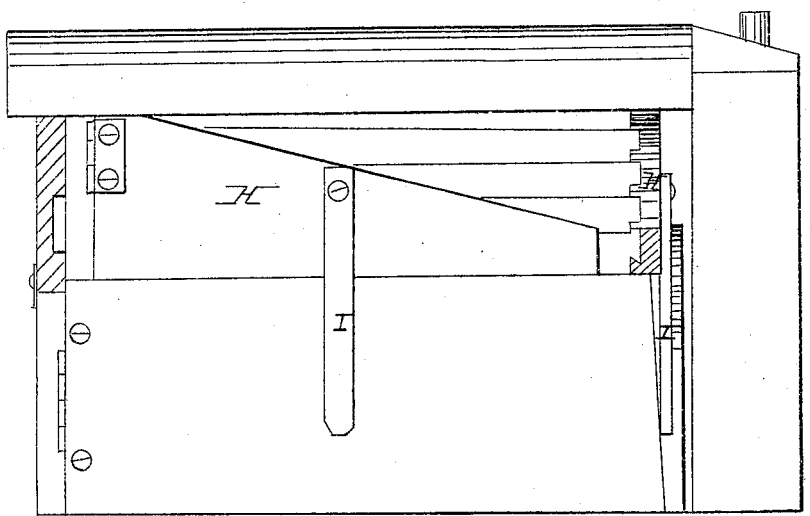

In using this drier, the fruit is spread upon the drawers L L, and they are closed up to their places in the box. The supporters H fold in like doors, as seen in fig. 3. A fire is kindled in the furnace D, and the heat arising circulates among the drawers and the fruit within them.

When it is desired to submit the fruit to the action of the sun, the supporters H are thrown open and braced, and the drawers are drawn out, in step-form, so as to expose the contents of each to the sun.

Having thus fully described my invention, what I claim as new, and desire to secure by Letters Patent, is—

1. The drawers L L, arranged together within dove-tailed grooves in the partition-boards C C', and connected by the pins $a$ in their rear rails, as and for the purpose set forth.

2. The grooved and hinged supporters H, the drawers L L, the stays J, and arms I I, arranged and used as and for the purpose set forth.

In testimony that I claim the foregoing, I have hereunto set my hand, this 4th day of June, 1867.

DILECTUS DURFEE.

Witnesses:
A. C. BALDWIN,
FRED. P. BLOOM.